No. 622,590. Patented Apr. 4, 1899.
J. P. AUTRIE.
CAR COUPLING.
(Application filed Dec. 5, 1898.)
(No Model.)
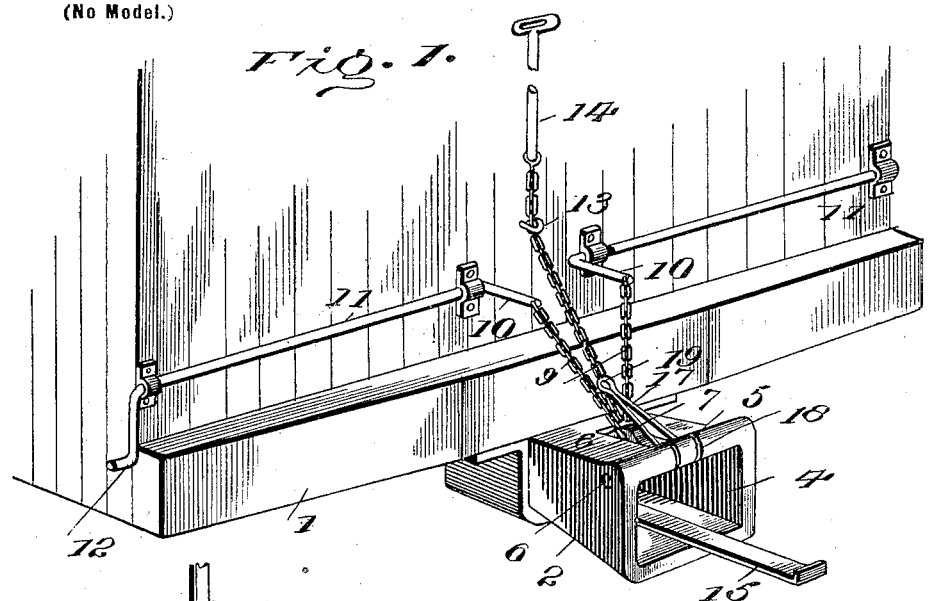
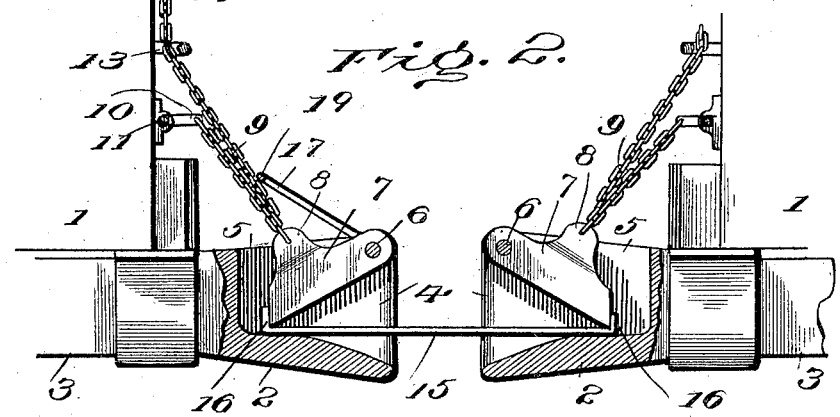
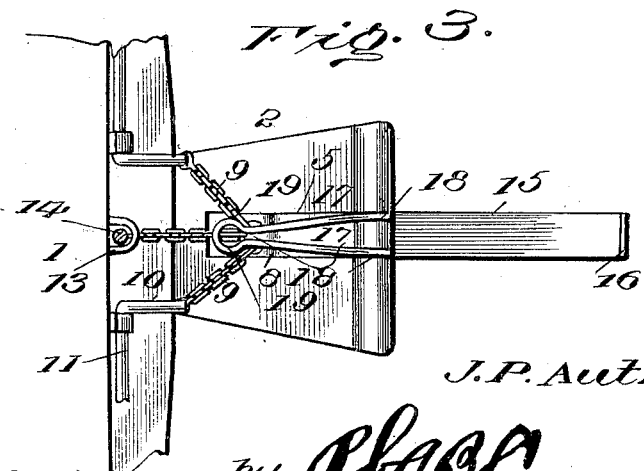
Witnesses
Inventor
J. P. Autrie
by his Attorneys

UNITED STATES PATENT OFFICE.

JAMES P. AUTRIE, OF CONDOR, GEORGIA.

CAR-COUPLING.

SPECIFICATION forming part of Letters Patent No. 622,590, dated April 4, 1899.

Application filed December 5, 1898. Serial No. 698,323. (No model.)

*To all whom it may concern:*

Be it known that I, JAMES P. AUTRIE, a citizen of the United States, residing at Condor, in the county of Laurens and State of Georgia, have invented certain new and useful Improvements in Car-Couplers; and I do hereby declare the following to be a full, clear, and exact description of the invention, such as will enable others skilled in the art to which it appertains to make and use the same.

This invention has relation to that class of automatic car-couplers in which the coupling is effected by the engagement of a pivoted dog with a projection on the end of the coupling-link; and the object of the same is to secure simplicity and strength in devices of this character and through the medium of their durability and economy of manufacture facilitate their general use and also to provide in connection therewith suitable devices for releasing the dog to prevent the passage of operators or trainmen between ends of opposing cars, and thereby avoid accidents.

The invention consists of the construction and arrangement of the several parts, which will be more fully hereinafter described and claimed.

In the accompanying drawings, Figure 1 is a perspective view of a portion of the end of a car, showing the improved coupler attached thereto. Fig. 2 is a sectional side elevation of two couplers and portions of the ends of opposing cars and embodying the invention. Fig. 3 is a top plan view of the improved coupler and a part of its supporting device.

Referring to the drawings, wherein similar numerals are utilized to indicate corresponding parts in the several views, the numeral 1 designates a portion of a car, which in the present instance is shown as a box-car; but it will be understood that the improved coupler is adapted to be applied to any form of car. Applied to the end of the car in the usual manner is a draw-head 2, attached to a draw-bar 3 and having a link-orifice 4 and an upper longitudinally-disposed slot 5. Extending transversely across the upper portion of the draw-head 2 and the slot 5 is a pivot pin or rod 6, on which a dog 7 has its front end pivotally swung and movable in the slot 5. The normal position of the dog 7 is at a downward angle of inclination, and by such arrangement the under edge or bottom of said dog is disposed at an oblique angle relatively to the mouth of the orifice 4. The rear end of the dog is in a beveled plane and presents a straight engaging face when in locking position, as shown by Fig. 2. On the rear upper portion of the dog an ear 8 is formed, to which are connected the lower ends of a series of chains or analogous devices 9, which extend upwardly and are in part attached to angular ends 10 of levers 11, journaled on the end of the car and extending outwardly to opposite sides of the latter and terminating in crank-handles 12, by means of which the dog may be raised from either side to disengage it from a coupling position. Another of the chains 9 extends upwardly through a guide 13 on the end of the car and is attached to a vertical sliding rod 14, which is intended to extend upwardly to the top of a box-car, and thus accommodate the operation of the coupler from such point.

It will be understood that the levers 11 and the rod 14 may all be applied to a box-car or a part thereof, and, further, that in connection with some cars the use of the levers 11 only may be found necessary.

A flat solid link 15 is used in connection with the improved coupler and has its opposite ends 16 upturned at right angles to be engaged by the rear ends of the dogs 7 in opposing draw-heads.

In operation the link 15, carried by one draw-head, is brought toward the opposing draw-head, and the unengaged upturned end 16 strikes the under edge of the dog 7 in the draw-head to be coupled and raises said dog gradually and until the said upturned end has passed the rear end of the dog. The latter then drops down in advance of the upturned end of the link, and an automatic coupling is thereby secured. It will be seen from the accompanying drawings that sufficient space is left between the rear end of the dog and the rear wall of the orifice 4 in the draw-head 2 to allow a play or movement of the link, which is beneficial not only in the coupling operation, but also in a back movement of the cars and when the draw-heads are brought closer together. The link 15 is also of such width as to permit the cars to have a lateral swing or sway in rounding curves or for other purposes, and a vertical rise or movement of the end of the car will not tend to disengage the coupling-link from the dogs bearing thereon. In forming the link 15 it is preferred that a flat bar of metal be used and the opposite ends upturned by forging or otherwise, and a very cheap and durable link is thus provided. The several parts are of such simple construction that the ordinary draw-head now commonly used can be easily changed to accommodate the improved structure and permit the application of the dogs.

It is often found necessary to couple cars having different forms of couplers, and to connect the present form of coupler with the ordinary pin-coupling a swinging link 17 is employed and has its free ends 18 looped around the pivot-pin 6 on opposite sides of the front part of the dog 7. From the said free ends 18 of the swinging link the body of the latter is gradually converged and formed into an eye 19. When in use, the said link 17 is thrown over from the front of the draw-head and in advance of the latter and the eye 19 inserted in the opposing head and engaged by the coupling-pin. When not in use, the said link 17 is thrown back over the top of the draw-head, as shown by the drawings.

Changes in the proportions, dimensions, and minor details of construction could be resorted to without in the least departing from the nature or spirit of the invention.

Having thus described the invention, what is claimed as new is—

In a car-coupler, the combination of a draw-head having a slot in the upper portion thereof and a pivot-pin extending therethrough and across the slot, a gravitating dog having its front end engaged by said pivot-pin and normally disposed at a downward angle of inclination, a flat coupling-link with upturned ends to engage the dog, and a swinging link having its ends mounted on the said pivot-pin on opposite sides of the front end of the dog and its rear end formed into an eye to engage the ordinary coupling-pin.

In testimony whereof I affix my signature in presence of two witnesses.

JAMES P. AUTRIE.

Witnesses:
W. H. WOOD,
E. J. BLACKSHER.